(12) United States Patent
Planz

(10) Patent No.: US 7,559,568 B2
(45) Date of Patent: Jul. 14, 2009

(54) ADAPTOR FOR COUPLING A DRAWBAR OF A TRACTOR TO A RECEIVER HITCH

(76) Inventor: Austin Planz, 29 Planz La., Bridgewater, CT (US) 06752

( * ) Notice: Subject to any disclaimer, the term of this patent is extended or adjusted under 35 U.S.C. 154(b) by 337 days.

(21) Appl. No.: 11/393,628

(22) Filed: Mar. 30, 2006

(65) Prior Publication Data

US 2007/0035107 A1 Feb. 15, 2007

Related U.S. Application Data

(60) Provisional application No. 60/708,158, filed on Aug. 15, 2005.

(51) Int. Cl.
 *B60D 1/155* (2006.01)
(52) U.S. Cl. ............... 280/416; 280/495; 280/500; 280/502
(58) Field of Classification Search ........... 280/416, 280/495, 500, 502
See application file for complete search history.

(56) References Cited

U.S. PATENT DOCUMENTS

| | | | | |
|---|---|---|---|---|
| 1,223,093 | A * | 4/1917 | Nelson | 280/416 |
| 1,326,551 | A | 12/1919 | Turnbull | |
| 1,770,291 | A * | 7/1930 | Adkins | 280/416 |
| 2,635,891 | A * | 4/1953 | Cook | 280/495 |
| 3,578,358 | A * | 5/1971 | Reynolds | 280/500 |
| 4,008,906 | A | 2/1977 | Schafer et al. | |
| 4,361,342 | A | 11/1982 | Duffield | |
| 5,647,441 | A * | 7/1997 | Gibbons | 172/439 |
| 6,250,664 | B1 * | 6/2001 | Tetrick | 280/495 |
| 6,361,062 | B1 * | 3/2002 | Edin et al. | 280/416.2 |
| 6,390,489 | B1 | 5/2002 | Friesen | |
| 6,390,490 | B1 * | 5/2002 | Campbell | 280/510 |
| 6,742,799 | B1 | 6/2004 | Hansen | |
| 6,758,486 | B1 | 7/2004 | Kollath | |
| 6,846,001 | B2 * | 1/2005 | Seksaria et al. | 280/495 |
| 6,896,282 | B1 | 5/2005 | McKinley | |
| 6,945,551 | B2 * | 9/2005 | Blake | 280/507 |
| 7,040,644 | B1 * | 5/2006 | Adams et al. | 280/460.1 |
| 2002/0171225 | A1 | 11/2002 | Adair | |

FOREIGN PATENT DOCUMENTS

CA 2 372 446 A1 9/2000

* cited by examiner

*Primary Examiner*—Paul N Dickson
*Assistant Examiner*—Marlon A Arce
(74) *Attorney, Agent, or Firm*—Carmody & Torrance LLP

(57) ABSTRACT

The present invention is directed to an improved adaptor for easily and removably coupling a drawbar of a tractor or other vehicle to a standard receiver hitch and a method of using the improved adaptor. The adaptor of the invention includes an adaptor body configured to receive a section of the drawbar, a leg coupled to the adaptor body, the leg extending essentially perpendicular to the adaptor body and having an opening for receiving an end of the receiver hitch. The drawbar is couplable to the adaptor body and the leg is couplable to the end of the receiver hitch.

23 Claims, 3 Drawing Sheets

ADAPTOR FOR COUPLING A DRAWBAR OF A TRACTOR TO A RECEIVER HITCH

CROSS REFERENCE TO RELATED APPLICATIONS

This application claims the benefit of U.S. Provisional Application No. 60/708,158, filed Aug. 15, 2005, the subject matter of which is herein incorporated by reference in its entirety.

FIELD OF THE INVENTION

The present invention is directed to a novel adaptor for adapting drawbars attached to tractors to accept standard (e.g. 2-inch) hitches and ball mounts.

BACKGROUND OF THE INVENTION

There are many tractors and other vehicles that are equipped with drawbars and can be used to transport trailers and other implements. These drawbars typically have a ball that is semi-permanently mounted by means of a nut and lock washer. An example of this coupling mechanism is described in U.S. Pat. No. 4,008,906 to Scafer et al. The ball coupling includes a hitch ball having a stud inserted in a hole in the drawbar that is secured by means of a nut, which is threaded onto the threaded portion of the stud and locked in place. Depending on the trailer or implement being attached, the mounted ball may need to be changed or removed. This can be a cumbersome process, requiring additional time and a place to store all of the necessary parts together.

Many vehicles have quick interchangeable hitches that vary in style and function. It would be desirable to owners of tractors to have the same options and versatility enjoyed by owners of receiver tubes to allow for quick and easy removal and replacement.

The present invention enables a standard receiver tube to be coupled to a tractor in an efficient manner. Tractor owners can quickly and easily use any standard two-inch hitch that can be removably coupled to the drawbar. With equal simplicity, a user can remove the adaptor and have use of just the drawbar.

SUMMARY OF THE INVENTION

A primary object of this invention is to provide an improved adaptor that can secure a standard hitch to the drawbar of a tractor or other vehicle.

Another object of the present invention is to provide an improved adaptor that can be easily removably attached to the drawbar of tractor or other vehicle with minimal effort.

To that end, in a preferred embodiment, the present invention is directed to an adaptor for coupling a drawbar of a tractor or other vehicle to a receiver hitch, wherein the adaptor comprises:

an adaptor body having an elongated channel configured to receive a section of the drawbar; and a leg coupled to the elongated channel, the leg extending essentially perpendicular to the elongated channel and having an opening for receiving an end of the receiver hitch;

wherein the drawbar is couplable to the adaptor body and the leg is couplable to the end of the receiver hitch.

In another preferred embodiment, the present invention is directed to an adaptor for coupling a drawbar of a tractor or other vehicle to a receiver hitch, wherein the adaptor comprises:

an adaptor body comprising a substantially planar plate couplable to a section of the drawbar; and a leg coupled to the substantially planar plate, the leg extending essentially perpendicular to the substantially planar plate and having an opening for receiving an end of the receiver hitch;

wherein the drawbar is couplable to the adaptor body and the leg is couplable to the end of the receiver hitch.

In yet another preferred embodiment, the present invention is directed to a method of coupling a drawbar of a tractor or other vehicle to an essentially orthogonally aligned receiver hitch using an adaptor comprising an adaptor body having an elongated channel configured to receive a section of the drawbar and a leg coupled to the elongated channel, the leg extending essentially perpendicular to the elongated channel and having an opening for receiving an end of the receiver hitch; the method comprising the steps of:

inserting the section of the drawbar into the elongated channel and locking the drawbar to the adaptor body; and inserting the end of the receiver hitch into the opening of the leg and locking the leg to the hitch.

BRIEF DESCRIPTION OF THE FIGURES

For a fuller understanding of the invention, reference is had to the following description taken in connection with the accompanying figures, in which.

Identical reference numerals in the figures are intended to indicate like features, although not every feature in every figure may be called out with a reference numeral.

DETAILED DESCRIPTION OF THE PREFERRED EMBODIMENTS

The present invention, in a preferred embodiment, is directed to an improved adaptor for coupling a drawbar of a tractor or other vehicle to a receiver hitch, which in one embodiment, by way of example and not limitation, may be a standard 2-inch square receiver hitch.

Figure 1:
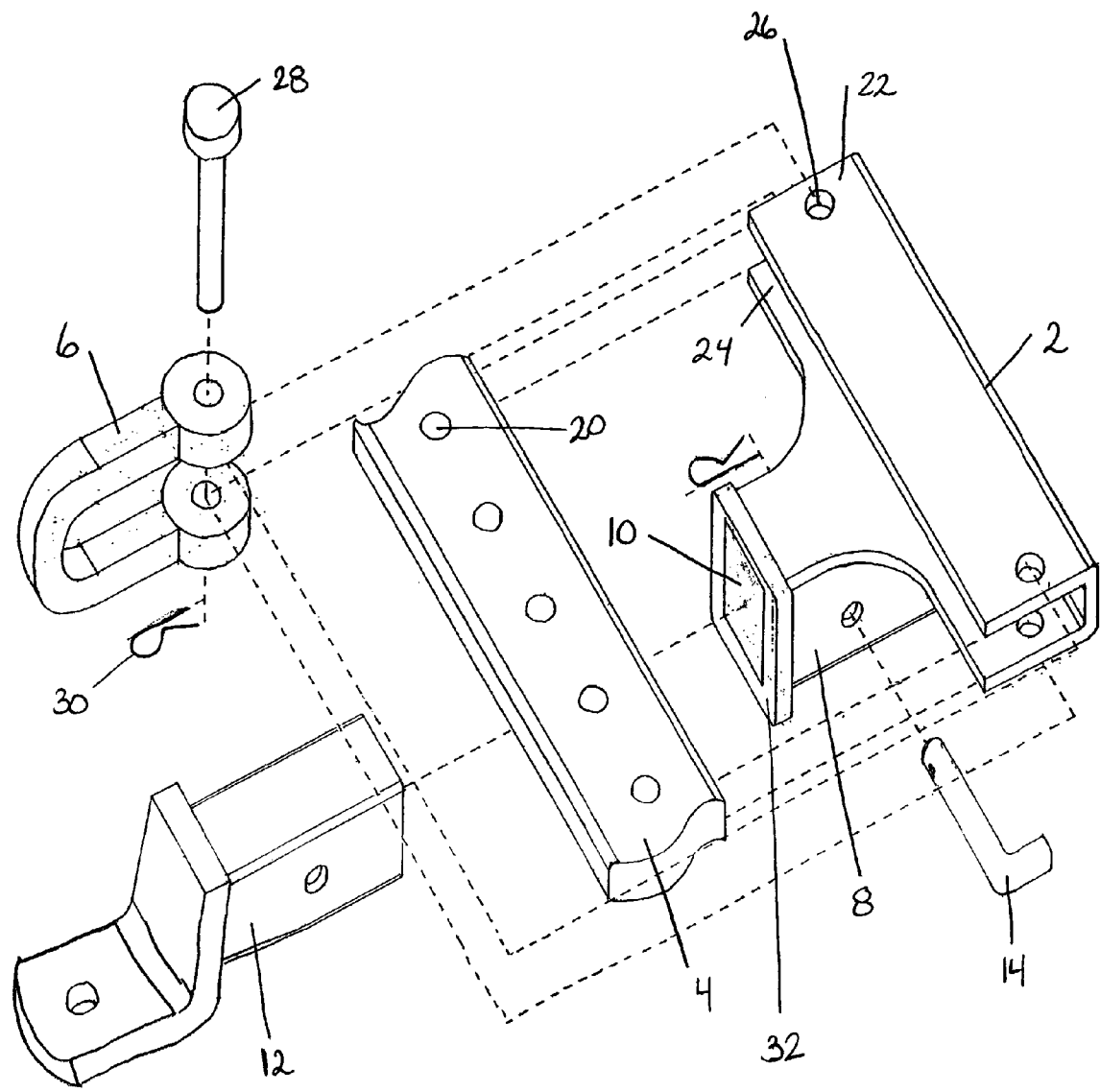
FIG. 1 depicts a first view of the adaptor of the invention.

In a first preferred embodiment, as depicted in FIG. 1, the adaptor comprises:

an adaptor body having a U-shaped elongated channel 2 configured to receive a section of the drawbar 4;

a first locking means 6 for releasably locking the drawbar 4 to the adaptor body;

a leg 8 coupled to the U-shaped elongated channel 2, the leg 8 extending essentially perpendicular to the U-shaped elongated channel 2 and having an opening therethrough 10 for receiving the hitch 12; and a second locking means 14 for releasably locking the leg 8 to the hitch 12.

In another preferred embodiment, the present invention is directed to an adaptor for coupling a drawbar of a tractor or other vehicle to a receiver hitch, wherein the adaptor comprises:

an adaptor body comprising a substantially planar plate couplable to a section of the drawbar; and a leg coupled to the substantially planar plate, the leg extending essentially perpendicular to the substantially planar plate and having an opening for receiving an end of the receiver hitch;

wherein the drawbar is couplable to the adaptor body and the leg is couplable to the end of the receiver hitch.

The drawbar 4 has at least one hole 20 extending from a top surface to a bottom surface thereof. The dimensions and materials of the drawbar 4 may differ depending on the specific drawbar and/or application of use.

To be sure, it should be understood that the elongated channel need not be U-shaped, but preferably is in the preferred embodiment. What is important is that the elongated channel and the section of the drawbar to which it is coupled be complementary shaped. In the preferred embodiment, the elongated channel 2 has a top surface 22 and a bottom surface 24 having at least one hole (e.g. 26 in the top surface 22) extending therethrough and alignable with each other and with the at least one hole 20 in the drawbar 4. The channel 2 slides onto the drawbar 4 from the tractor side of the drawbar (i.e., the side opposite the receiver hitch), substantially enclosing the drawbar 4 on three sides—top, bottom, and tractor side. The channel 2 is preferably metal (e.g., steel or hardened steel alloy) but the characteristics and properties of the metal may differ depending on the application of use.

While the dimensions of the adaptor body will depend on the particular drawbar, the preferable elongated channel 2 is generally in the range of about 0.25 to 1 inch thick. The width of the elongated channel 2 may range from about 4 to about 18 inches. The overall height of the elongated channel 2 may be from about 1 to about 5 inches. The depth of the elongated channel 2 will vary based on the width of the drawbar 4, but is typically in the range of about 4 to about 8 inches. The diameter of the holes (e.g. 26) in the elongated channel 2 may range from about 0.25 to about 1 inch. These dimensions are given by way of illustration and are in no way limiting.

Figure 2:
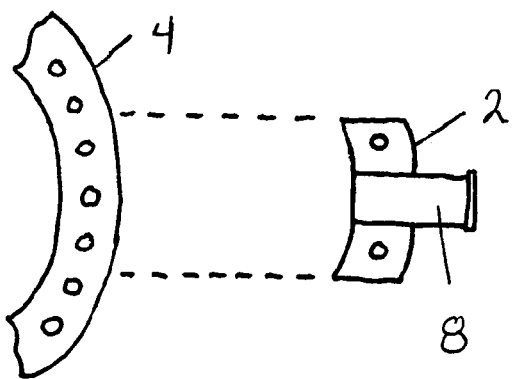
FIG. 2 depicts a different embodiment of the adaptor of the invention.

As depicted in FIG. 2, in another embodiment, the drawbar 4 may be curved and will thus require a complementary curved elongated channel 2 to match such a curve.

Figure 4:
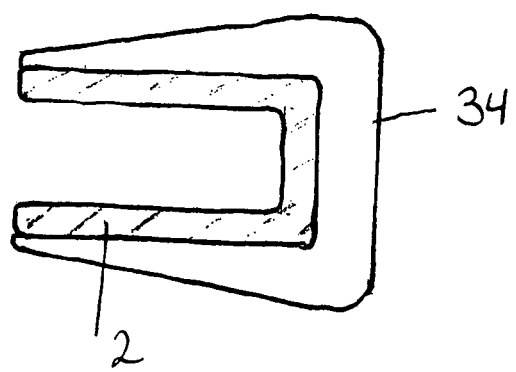
FIG. 4 depicts an embodiment of the invention wherein additional support is provided to the adaptor body.

As depicted in FIG. 4, in one embodiment of the invention, the elongated channel 2 may be equipped with ribs 34 that surround the outer surface of the elongated channel to increase its vertical strength and rigidity. The placement, thickness, and size of the ribs is not critical to the invention and will depend on the specific application.

In one embodiment of the invention, the first locking means comprises at least one clevis 6. The clevis 6 has holes extending through each end and is releasably securable to the top surface 22 and the bottom surface 24 of the elongated channel with a securing pin 28 that is insertable through the hole in the first end of the clevis 6, the at least one hole in the top surface 22 of the adaptor body, the at least one hole 20 in the drawbar 4, the at least one hole in the bottom surface 24 of the adaptor body, and the hole in the second end of the clevis 6, and is securable with a lynch pin 30. Preferably, at least two first locking means are used.

The at least one clevis 6 slides on from the back most (opposite the tractor side) side of the drawbar 4. The at least one clevis can serve as an attachment point for trailer chains, ropes cables, etc. and may also help to resist vertical fatigue. The at least one clevis 6 may be constructed of hardened metal and can be twisted or straight. The diameter of the devises typically range from about 0.25 to about 1 inch. The height and bend of the devises depends on the drawbar as well as the specific application. The height, thickness, and hardness of the lynch pins may also vary.

In another embodiment, the first locking means comprises a securing pin that is insertable through the at least one hole in the top surface of the adaptor body, the at least one hole in the drawbar, and the at least one hole in the bottom surface of the adaptor body and is securable with a lynch pin.

Figure 5:
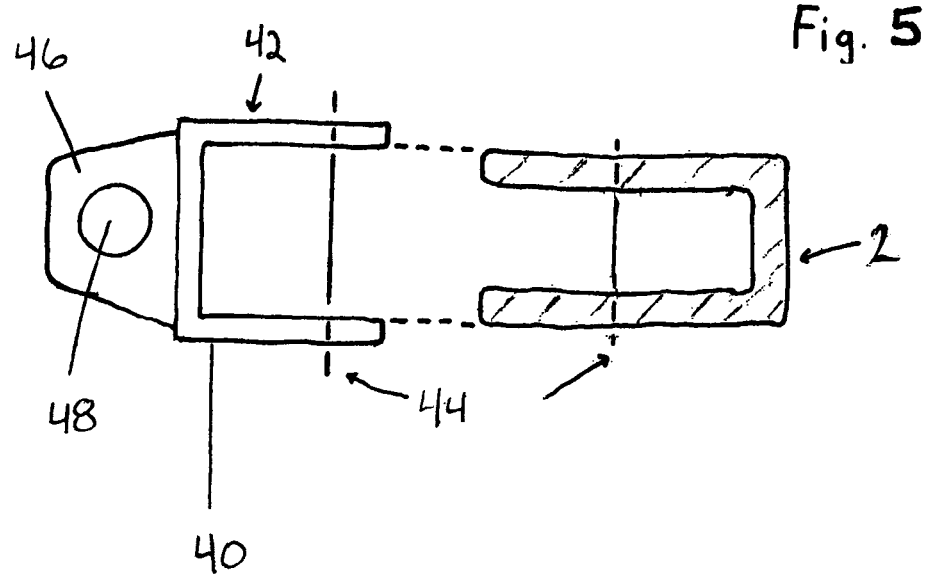
FIG. 5 depicts a view of a different locking means for use with the adaptor of the invention.

In yet another embodiment, as depicted in FIG. 5, the first locking means comprises a C-shaped clip 40 having a top surface 42 and a bottom surface 44 and at least one hole extending therethrough and alignable with each other, wherein the C-shaped clip 40 is releasably securable to the top surface 22 and the bottom surface 24 of the U-shaped elongated channel 2 with a securing means that is insertable through the hole in the top surface of the C-shaped clip 40, the at least one hole in the top surface 22 of the elongated channel 2, the at least one hole 20 in the drawbar 4, the at least one hole in the bottom surface 24 of the elongated channel 2 and the hole in the bottom surface 44 of the C-shaped clip 40. The C-shaped clip 40 may further comprise a tab 46 attached thereto. If present, tab 46 typically has at least one hole 48 extending therethrough for attaching a chain or rope to the adaptor.

Figure 3:
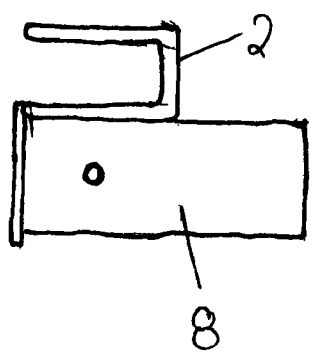
FIG. 3 depicts another embodiment of the adaptor of the invention.

The leg 8 of the adaptor is preferably a two-inch (inside dimension) square tube with a minimal wall thickness of about 0.25 inches. The length of the leg 8 depends on the specific application, as does its exact attachment to the channel 2 of the adaptor. As depicted in FIG. 3, different applications may require a lateral and/or a longitudinal relocation of the leg 8 on the adaptor body. This displacement may be, by way of example and not limitation, because of tire clearance or hole alignment on the drawbar 4.

The adaptor of the invention is typically preferably made from cold rolled mild steel that is hardened to specification, although the specific steel, alloy, and hardness of the materials may be specific to a given application. In addition, the leg 8 and elongated channel 2 may be separately fabricated and then welded or fastened together with suitable fastening means. Alternatively, the leg 8 and the elongated channel may be cast or otherwise formed as a single integral unit. The leg 8 may also be positioned on the top or the bottom of the elongated channel 2. If desired, to provide stability and strength, a supporting ring/channel 32 may be attached to the opening of the leg 8 that receives the receiver hitch 12. If used, the supporting ring/channel 32 is preferably a second square tube that is about 0.25 inches thick by 0.25 inches long that is secured (e.g., welded) over the end of the leg 8 that receives the hitch 12.

The leg 8 of the adaptor comprises at least two holes that are opposably positioned, through which the second locking means 14 may be inserted. The receiver hitch 12 has at least two holes that are opposably positioned and alignable with the at least two opposably positioned holes in the leg 8. In one embodiment the centers of the holes in the leg are approximately 2.5 inches from the end of the leg 8 that receives the hitch 12. The holes are typically about 0.625 inches in diameter, although holes of other diameters would also be usable in the practice of the invention.

The second locking means may comprise a hitch pin 14 or other securing means that is insertable through the holes in the receiver 12 and the leg 8.

Although it is intended that the adaptor described herein be usable on tractors, its use is not limited to tractors. It is envisioned that the adaptor of the present invention would be usable on other vehicles where it would be desirable to easily and removably couple a receiver hitch.

Figure 6:
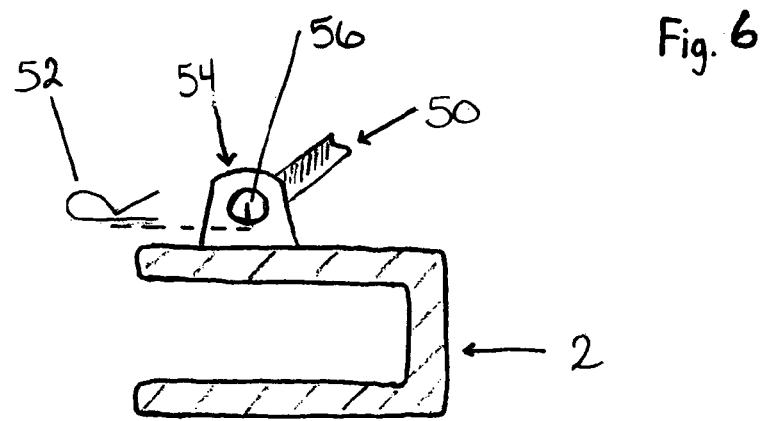
FIG. 6 depicts an embodiment wherein the adaptor is coupled to a drawbar that is attached via a three point hitch.

Many tractors and other vehicles do not have rigid drawbars attached directly to the frames, but instead have drawbars that are attached via a three-point hitch. Thus a modification may be needed for coupling the center link 50 to the adaptor body 2, as shown in FIG. 6. The center link 50 is the often adjustable rod that is attached from a three-point hitch implement to the three-point hitch and keeps the implement level through the vertical movement of such implement. The modification include a connecting point on the adaptor body 2, which typically comprises two vertical metal tabs 54, each of which has a hole 56 extending therethrough. The two metal tabs 54 are typically spaced 1.75 inches apart with holes 56 that are aligned and that are typically 0.75 inches in diameter. The metal tables 54 will often be between about 0.3 inches and about 1.0 inches in thickness with at least about 0.5 inches of material around the holes 56. Again, these dimension are provided by means of illustration and are by no means limiting. This connecting point is generally located near the middle of the tractor on the adaptor body, on the receiver tube, or both. The center link 50 also has a corresponding hole (not shown) located near one end. The center link 50 is couplable to the adaptor body by positioning the center link 50 between the metal tabs 54 and inserting a pin 52 through the hole 56 in the first metal tab 54, the hole in the center link 50 and the hole in the second metal tab.

As can be seen by the foregoing, the present invention is also directed to a method of coupling a drawbar of a tractor or other vehicle to an essentially orthogonally aligned receiver hitch using an adaptor comprising an adaptor body having an elongated channel configured to receive a section of the drawbar and a leg coupled to the elongated channel, the leg extending essentially perpendicular to the elongated channel and having an opening for receiving an end of the receiver hitch; the method comprising the steps of:

inserting the section of the drawbar into the elongated channel and locking the drawbar to the adaptor body; and inserting the end of the receiver hitch into the opening of the leg and locking the leg to the hitch.

To be sure, it should be understood that the term "locking" as used herein should be understood to permit both "locking" as would be understood in the art and the releasable locking thereof. Thus the locking step and locking means of the present invention could be either means for permanently coupling or locking the structures together or releasably coupling or locking the structures together. In addition, other types of locking means such as "snap-in" type ball arrangements are also contemplated herein.

Lastly, it should be understood that as used herein, "U-shaped" is deemed to mean a shape that can complementary receive a drawbar having a square or rectangular cross-section, as illustrated by the channel depicted in the figures.

Although safe working load limits and specifications will typically be determined by the tractor and the drawbar mounted thereon, most versions will have a safe working load in excess of a 10,000 pound gross trailer weight and a 1,000 pound gross tongue weight rating (i.e. the downward pressure placed on the ball by the coupler).

While the present invention has been described in conjunction with its preferred embodiments, it is understood that many alternatives, modifications, and variations will be apparent to those skilled in the art in light of the foregoing description. Accordingly, this invention is intended to embrace all such alternatives, modifications, and variations that fall with the spirit and scope of the claimed invention.

What is claimed is:

1. An adaptor for coupling a drawbar of a tractor or other vehicle to a receiver hitch, the adaptor comprising:

an adaptor body having an elongated channel configured to receive a section of the drawbar, wherein the elongated channel has a U-shape; and a leg coupled to the elongated channel, the leg extending essentially perpendicular to the elongated channel and having an opening for receiving an end of the receiver hitch;

a first locking means for locking the drawbar to the adaptor body; and a second locking means for locking the leg to the hitch;

wherein the drawbar is couplable to the adaptor body and the leg is couplable to the end of the receiver hitch.

2. The adaptor according to claim 1, wherein the drawbar and the elongated channel are complementary shaped.

3. The adaptor according to claim 2, wherein the drawbar has a square or rectangular cross-section and the elongated channel has a complementary U-shape.

4. The adaptor according to claim 3, wherein the drawbar has at least one alignable opening extending from a top surface to a bottom surface thereof.

5. The adaptor according to claim 4, wherein the U-shaped elongated channel has a top surface and a bottom surface each having a hole alignable with each other and with the at least one hole in the drawbar.

6. The adaptor according to claim 5, wherein the first locking means comprises a clevis having holes extending through each end, wherein the clevis is releasably securable to the top surface and the bottom surface of the elongated channel with a securing pin that is insatiable through the hole in the first end of the clevis, the at least one hole in the top surface of the elongated channel, the at least one hole in the drawbar, the at least one hole in the bottom surface of the elongated channel, and the hole in the second end of the clevis, and is securable with a lynch pin.

7. The adaptor according to claim 5, wherein the first locking means comprises a securing pin that is insertable through the at least one hole in the top surface of the elongated channel, the at least one hole in the drawbar, and the at least one hole in the bottom surface of the elongated channel and is securable with a lynch pin.

8. The adaptor according to claim 5, wherein the first locking means comprises a C-shaped clip having a top surface and a bottom surface and at least one hole extending therethrough and alignable with each other, wherein the C-shaped clip is releasably securable to the top surface and the bottom surface of the elongated channel with a securing means that is insertable through the hole in the top surface of the C-shaped clip, the at least one hole in the top surface of the elongated channel, the at least one hole in the drawbar, the at least one hole in the bottom surface of the elongated channel and the hole in the bottom surface of the C-shaped clip.

9. The adaptor according to claim 8, wherein the C-shaped clip comprises a tab attached thereto, wherein the tab has at least one hole extending therethrough, whereby a chain or a rope may be attached.

10. The adaptor according to claim 5, wherein the first locking means comprises a bolt that is inset-table through the at least one hole in the top surface of the elongated channel, the at least one hole in the drawbar, and the at least one hole in the bottom surface of the elongated channel and is securable with a lynch pin.

11. The adaptor according to claim 1, wherein the leg comprises at least two holes that are opposably positioned, through which the second locking means may be inserted.

12. The adaptor according to claim 11, wherein the receiver hitch has at least two holes that are opposably positioned and alignable with the at least two opposably positioned holes in the leg.

13. The adaptor according to claim 12, wherein the second locking means comprises a hitch pin that is insertable through the holes in the receiver and the leg.

14. The adaptor according to claim 1, wherein the leg is welded to the elongated channel.

15. The adaptor according to claim 1, wherein the leg and the elongated channel are formed as an integral unit.

16. The adaptor according to claim 2, wherein the drawbar is curved over at least the section that is received by the adaptor body and the elongated channel has a corresponding curve.

17. The adaptor according to claim 2, wherein the elongated channel is surrounded by at least one rib to provide additional stability to the channel.

18. The adaptor according to claim 1, further comprising a three-point hitch coupled to the elongated channel on an opposite side of the channel from the leg that receives the hitch.

19. An adaptor for coupling a drawbar of a tractor or other vehicle to a receiver hitch, the adaptor comprising:

an adaptor body comprising a substantially planar plate couplable to a section of the drawbar; and a leg coupled to the substantially planar plate, the leg extending essentially perpendicular to the substantially planar plate and having an opening for receiving an end of the receiver hitch;

a first locking means for locking the drawbar to the adaptor body; and a second locking means for locking the leg to the hitch;

wherein the drawbar is couplable to the adaptor body and the leg is couplable to the end of the receiver hitch.

20. The adaptor according to claim 19, wherein the drawbar has a square or rectangular cross-section.

21. The adaptor according to claim 19, wherein the drawbar has at least one hole extending from a top surface to a bottom surface thereof.

22. The adaptor according to claim 21, wherein the substantially planar plate has at least one hole extending therethrough and alignable with the at least one hole in the drawbar.

23. The adaptor according to claim 22, wherein the first locking means is releasably securable to the substantially planar plate and the drawbar with a securing means that is insertable through the at least one hole in the substantially planar plate, the at least one hole in the drawbar, and is securable with a lynch pin.

* * * * *